United States Patent [19]

Ishiwata et al.

[11] Patent Number: 4,870,389

[45] Date of Patent: Sep. 26, 1989

[54] JOYSTICK

[75] Inventors: Takehiko Ishiwata, Kawasaki; Norifumi Yoshida, Hachiouji, both of Japan

[73] Assignee: ASCII Corporation, Tokyo, Japan

[21] Appl. No.: 346,329

[22] Filed: Apr. 27, 1989

Related U.S. Application Data

[63] Continuation of Ser. No. 46,990, May 5, 1987, abandoned.

[30] Foreign Application Priority Data

Feb. 23, 1987 [JP] Japan .................................. 62-40655

[51] Int. Cl.⁴ ............................................. G06F 3/14
[52] U.S. Cl. ..................................... 340/709; 340/706; 273/148 B
[58] Field of Search ................... 341/22; 340/706, 709, 340/910, 825.19; 273/148 B; 74/471 XY; 250/221

[56] References Cited

U.S. PATENT DOCUMENTS

| | | | |
|---|---|---|---|
| 4,241,521 | 12/1980 | DuFresne | 340/825.19 |
| 4,469,330 | 9/1984 | Asher | 273/148 B |
| 4,552,360 | 11/1985 | Bromley et al. | 340/709 |
| 4,618,146 | 10/1986 | Yoshida et al. | 273/148 B |
| 4,633,167 | 12/1984 | Kitts | 273/148 B |
| 4,766,423 | 8/1988 | Ono et al. | 340/709 |

OTHER PUBLICATIONS

Ken Uston—"Electronic Fun With Computers & Games" Nov. 1983 vol. #2—pp. 28–31.
John J. Anderson—"Drawing Conclusions"—creative computing equipment evaluation—Dec./83—pp. 32–50.

Primary Examiner—David K. Moore
Assistant Examiner—M. Fatahiyar
Attorney, Agent, or Firm—Koda and Androlia

[57] ABSTRACT

A joystick for a computer game which comprises a stick lever, a trigger button and a function button. In the joystick, when the function button is pressed down while the stick lever is inclined in one of directions or the trigger button is depressed, an operation specified by the inclination direction of the stick lever or by the trigger button can be executed intermittently or continuously, so that, even if the trigger button is operated long, it is possible to enhance the operation of the joystick, to reduce the fatigue of a player and to extend the life of the joystick.

8 Claims, 3 Drawing Sheets

JOYSTICK

This is a continuation of application Serial No. 046,990, filed May 5, 1987 now abandoned.

BACKGROUND OF THE INVENTION

1. Field of the Invention

The present invention relates to a joystick for use in a computer game.

2. Description of the Prior Art

Conventionally, a joystick for use in a computer game comprises a box of the order of 10cm square containing therein a control part for control of a 8 directions, and a stick lever provided on the box such that it can be operated to control the directions. The joystick is also provided with trigger buttons which are used to shoot balls, bombs and the like.

When the conventional joystick is applied to a shooting type of game or the like, in some cases, it is necessary to push the trigger buttons very often.

Also, since the conventional joystick lacks stability, if the stick lever is operated with a strange force, the joystick may be moved out of its installation place such as a desk or the like, resulting in a poor operability.

Further, generally there are two main types of games: that is, one employs a 4-direction operation; and the other employs an 8-direction operation. However, in the prior art a joystick construction for the 8-direction operation cannot be applied to the 4-direction operation type of game.

In the above-mentioned conventional joystick, a player must continue pushing the trigger buttons long time and intermittently, which causes the player to be greatly tired as well as reduces the life of the joystick. Further, as mentioned above, in the above conventional joystick, if the stick lever is operated with strong pressure, then the joystick may be moved out of its installation place such as a desk or the like due to its instability, resulting a poor operability.

SUMMARY OF THE INVENTION

The present invention aims at eliminating the drawbacks found in the above-mentioned prior art joystick.

Accordingly, it is an object of the invention to provide a joystick which is improved in operability, is able to reduce the fatigue of the player, and has no ill effect on the life thereof.

In attaining the above object, according to the invention, there is provided a joystick equipped with a stick lever for specifying directions and trigger buttons, in which there is provided a function button and when, with the function button depressed, the stick lever is inclined in one of directions or more of the trigger buttons are depressed, the operation to incline the stick lever or the operation specified by the trigger buttons can be performed intermittently or continuously.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof wherein.

DETAILED DESCRIPTION OF A PREFERRED EMBODIMENT OF THE INVENTION

Figure 1:
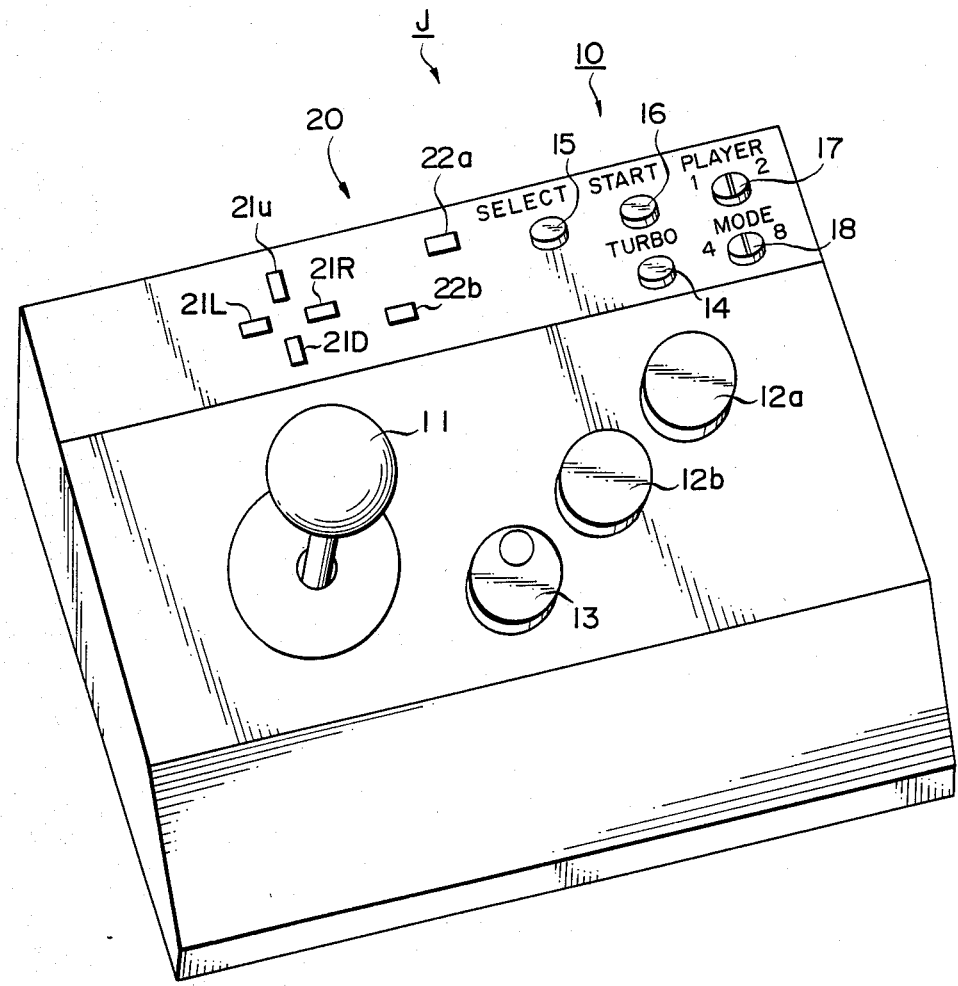
FIG. 1 is a perspective view of an embodiment of a joystick according to the present invention.
Figure 2:
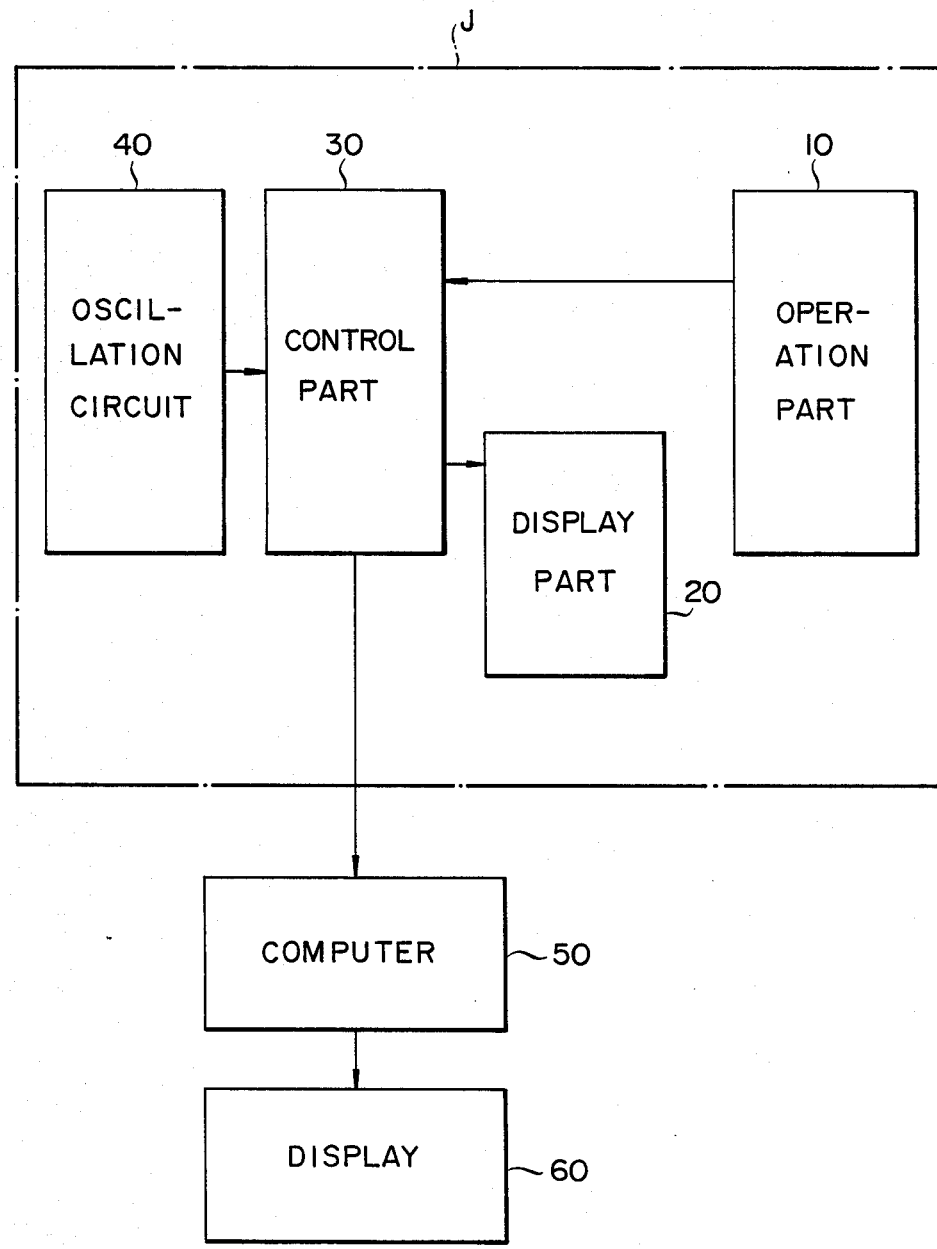
FIG. 2 is a block diagram of the above embodiment of the invention.

In FIG. 1, there is shown a perspective view of an embodiment of a joystick constructed in accordance with the present invention, and, in FIG. 2, there is illustrated a block diagram of the above embodiment of the invention.

A joystick, which is designated by J in these figures, comprises an operation part 10 having a plurality of buttons and the like therein, a display part 20 adapted to display for which of the above-mentioned buttons a continuous shooting mode is set, a control part 30 adapted to perform various controls in accordance with the operation of the operation part 10, and an oscillation circuit 40 adapted to generate pulses necessary to perform the continuous shooting mode. The joystick J is connected to a computer 50 and the contents of a game is dispayed on a display 60.

In FIG. 1, the operation part 10 of the joystick J comprises a stick lever 11 for specifying directions, a first trigger button 12a, a second trigger button 12b, a speed adjust button 13, turbo button 14 which is an example of function buttons, a select button 15 for selecting games, a start button 16 for starting the game, a button 17 for specifying the number of players, and a button 18 for specifying the specifying direction of the stick lever 11 in either of a 4-direction mode or an 8-direction mode.

Referring to the turbo button 14, while the stick lever 11 is inclined in one of the directions, if the turbo button 14 is depressed, then a given character is allowed to continue moving in the inclined direction of the stick lever 11; and, with trigger button 12a (or 12b) being depressed, if the turbo button 14 is pushed down, then the operation that is specified by the trigger button 12a (or 12b) can be performed intermittently or continuously (in the following description of this specification, the term "intermittently or continuously" will be expressed simply as "continuously".)

While the two trigger buttons 12a and 12b are being depressed simultaneously, if the turbo button 14 is depressed, then the operation specified by the trigger button 12a and the operation specified by the trigger button 12b are carried out simultaneously and continuously. Alternatively, the number of the trigger button may be one or three or more.

The speed adjust button 13 is a button which is used to adjust the speed of continuous execution of the operation specified by the inclined direction of the stick lever 11 or by the trigger buttons 12a, 12b.

Also, with the select button 15 being depressed, if the turbo button 14 is pushed down, then a cursor in a menu screen is moved continuously. With the start button 16 depressed, if the turbo button 14 is depressed, then a screen displayed on an image display device is caused to move in slow motion.

The display part 20 includes an LED 21U, an LED 21D, an LED 21L, an LED 21R, an LED 22a, and an LED 22b. The LEDs 21U, 21D, 21L and 21R are respectively used to indicate that the stick lever 11 is inclined in the respective upward, downward, rightward and leftward directions and simultaneously with this inclination the turbo button 14 is depressed. In the 8-direction mode, for each of oblique directions two of of the LEDs turn on: for example, in the case of an upper right direction, the LEDs 21R and 231U will turn on. The LEDs 22a and 22b are respectively used to indicate that the turbo button 14 is depressed simultaneously when the trigger buttons 12a, 12b are depressed.

The control part 30 is an example of means which allows the operation to be executed intermittently or continuously, that is, the operation that is specified by the inclined direction of the stick lever 11 or by the trigger 12a or 12b when the function button 14 is depressed while the stick lever 11 is inclined in one of the directions or while the trigger button 12a or 12b is being depressed. The above-mentioned continuous shooting mode means the above-mentioned intermittent or continuous operation.

Also, the control part 30 is adapted to specify one of 4 directions by means of a point of contact which is first contacted when using the stick lever 11 that can detect 8 directions by means of four points of contact with respect to the software in which a character on the screen can be moved due to the inclination of the stick lever only in four directions.

Figure 3:
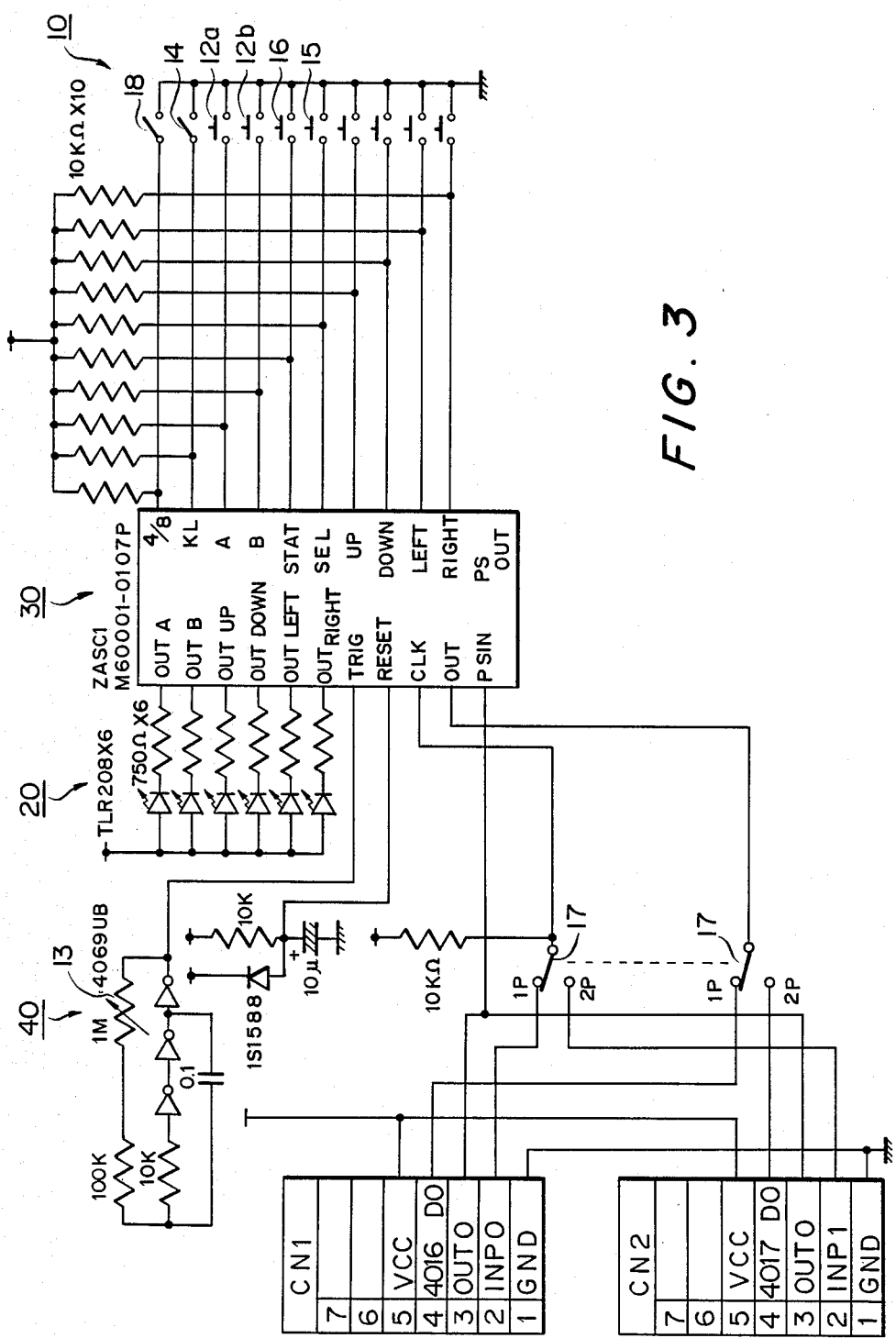
FIG. 3 is a circuit diagram to show the above embodiment of the invention more concretely.

Referring now to FIG. 3, there is shown a circuit diagram, in which the embodiment shown in FIG. 2 is illustrated in a more concrete manner.

In this circuit, 6 pieces of TLR 208 which are respectively standard products of CMOS IC are used as the LEDs in the display part 20, a port KL of IC used is the control part 30 is a turbo setting switch (that is, a switch used to store the state of the turbo button just when it is turned on), a port PSIN is used to switch parallel/serial input, and a port RESET is dedicated to power-on resetting. As LEDs in a display part 40, 3 of 6 gates of 4069UB which is a standard product of CMOS IC.

Next, description will be given of the operation of the above-mentioned embodiment.

At first, the power supply of the computer 50 put into work and, after a plurality of game modes are displayed, the select button 15 is depressed to select a desired game. Next, the start button 11 is depressed to excute the game selected, that is, the game is initiated.

After then, the stick lever 11 may be inclined in a given direction or the trigger button 12a or 12b may be pushed down to develop the game. For example, when shooting a bomb to destruct an object in the air, the trigger button 12a may be depressed and, when shooting a bomb to destruct an object on the ground, the trigger button 12b may be pushed down.

On the other hand, according to the progress of the game, when it is desired to shoot bombs continuously at the above-mentioned object in the air, the turbo button 14 may be depressed while the trigger button 12a is being pushed down, and, when it is desired to continuously shoot bombs at the object on the ground, the turbo button 14 may be pushed down with the trigger button 12b depressed. That is, as a result of this, the predetermined operations that have been specified by the trigger buttons 12a, 12b can be performed continuously. When shooting the bombs at the air-object and ground-object simultaneously, the turbo button 14 may be depressed while the two trigger buttons are pushed down simultaneously. As mentioned before, when the turbo button 14 is depressed while the trigger button 12a is pushed down, the LED 22a is caused to turn on, while, if the turbo button 14 and the trigger button 12b are depressed at the same time, then the LED 22b turns on.

Also, when it is desired to continuously move a bomb shooter such as a combat tank or the like, with the stick lever 11 being inclined in a desired direction, the turbo button 14 may be depressed. As a result of this, a character such as a combat tank or the like can be easily moved in a given direction continuously. In this case, the LED will turn on in the same direction as the stick lever 11 is inclined. For example, if the stick lever 11 is inclined in the right direction, the LED 21R will turn on.

More particularly, when the turbo button 14 is depressed and is then released, if the trigger buttons 12a, 12b are being pressed down, then the continuous shooting mode that corresponds to the trigger button depressed is to be executed. Also, the continuous movements are to be executed in the direction that corresponds to the direction of inclination of the stick lever 11 when the turbo button 14 is depressed and then released.

On the other hand, while the menu screen is being displayed, if the turbo button 14 is pressed down with the select button 15 depressed, then the cursor on the menu screen is moved continuously. It should be noted here that on the menu screen there are displayed items such as one player, two players, save, load and the like and the cursor is displayed at a position corresponding to one of these items. That is, in this circumstance, while the select button 15 being depressed, if the turbo button 14 is pressed down, the positions of the above-mentioned cursor are sequentially varied, namely, the curso is caused to move continuously.

Also, if the turbo button 14 is pressed down with the start button 16 depressed in the course of the game, then the operation then displayed on the image display device such as a CRT or the like can be moved in slow motion.

If the stick lever 11, which is adapted to have 4 points of contact and to detect the 8 directions by means of the 4 contact points, is used for the software in which the character on the screen can be moved in only four directions by means of inclination of the stick lever, then the contact point that is contacted first is able to specify one of the four directions. This means that the stick lever 11 can be applied to a 4-direction type mode as well.

When it is desired to release the continuous operation of the turbo button 14 after it is used, only the turbo button 14 may be depressed without operating the trigger buttons 12a, 12b, and the stick lever 11. As a result of this, the continuous shooting mode that has been set up to the time can be removed. After then, in order to set the same or a different continuous shooting mode, the same operations as mentioned above may be carried out.

As has been described hereinbefore, according to the invention, there is eliminated the need for a player to continue depressing the trigger button(s) for a long time and intermittently, and, therefore, the present invention is able to reduce the fatigue of the player to a great extent, extend the life of the joystick, and enhance the operability operation of the joystick.

It is further understood by those skilled in the art that the foregoing descriptiomn is a preferred embodiment of the disclosed device and that various changes and modifications may be made in the invention without departing from the spirit and scope thereof.

What is claimed is:

1. A joystick for a video game comprising a stick lever for specifying directions and at least one trigger button which causes an operation in said video game when depressed, and a function button which is arranged and configured such that when said stick lever is inclined in one of said directions or said trigger button is depressed when said function button is pressed down and then released, a direction specified by said direction of inclination of said stick lever or said operation caused by said trigger button being depressed is continued to be performed even though the trigger button has been released or the stick lever is no longer inclined in said one of said directions.

2. A joystick as set forth in claim 1, wherein said trigger button comprises two trigger buttons and, when said function button is pressed down while said two trigger buttons are being depressed, two operations of said video game respectively specified by said two trigger buttons are performed.

3. A joystick as set forth in claim 1, wherein there is provided a speed adjust button adapted to adjust a speed at which said operation specified by said direction of inclination of said stick lever or said trigger button is performed intermittently or continously.

4. A joystick as set forth in claim 1, wherein there is provided a select button adapted to select a game and, when said function button is pressed down while said select button is being depressed, a cursor on a menu screen can be moved continuously.

5. A joystick as set forth in claim 1, wherein there is provided a start button adapted to start a game and, when said function button is pressed down while said start button is being depressed, the video game displayed on an image display device can be moved in slow motion.

6. A joystick as set forth in claim 1, wherein there are provided a plurality of LEDs respectively adapted to indicate one of said directions of inclination of said stick lever.

7. A joystick as set forth in claim 1, wherein there is provided an LED adapted to indicate that said operation is being executed intermittently or continously due to the fact that said trigger button is depressed.

8. A joystick as set forth in claim 1, further comprising means whereby said stick lever can selectively specify 8 or 4 directions of movement for a character by said inclination of said stick lever.

* * * * *

REEXAMINATION CERTIFICATE (3229th)
United States Patent [19]
Ishiwata et al.

[11] B1 4,870,389
[45] Certificate Issued Jun. 17, 1997

[54] JOYSTICK

[75] Inventors: Takehiko Ishiwata, Kawasaki; Norifumi Yoshida, Hachiouji, both of Japan

[73] Assignee: ASCII Corporation, Tokyo, Japan

Reexamination Request:
No. 90/003,374, Mar. 28, 1994

Reexamination Certificate for:
Patent No.: 4,870,389
Issued: Sep. 26, 1989
Appl. No.: 346,329
Filed: Apr. 27, 1989

Related U.S. Application Data

[63] Continuation of Ser. No. 46,990, May 5, 1987, abandoned.

[30] Foreign Application Priority Data

Feb. 23, 1987 [JP] Japan .................................. 62-40655

[51] Int. Cl.$^6$ .................................................. A63B 71/00
[52] U.S. Cl. ..................... 463/38; 345/145; 345/146; 345/161
[58] Field of Search .......................... 273/438, 148 B, 273/85 G, 88, 94; 341/20, 21; 345/161, 157; 74/471 XY

[56] References Cited

U.S. PATENT DOCUMENTS

| | | |
|---|---|---|
| 4,425,488 | 1/1984 | Moskin et al. ............... 273/148 B |
| 4,633,167 | 12/1986 | Kitts. |
| 4,679,719 | 7/1987 | Kramer. |
| 4,748,441 | 5/1988 | Bozeinski ................... 273/148 B |
| 4,766,423 | 8/1988 | Ono et al.. |

OTHER PUBLICATIONS

Linzmayer "Controller update", Sep. 1983, full text record.
Quickshot II box, Copyright 1984.
Quickshot promotional piece.
Computer Products, 174–175 (Jul. 1984).
Computer Products, 132 (Jan. 1985).
Descriptive pieces about the Cheetah 125+ joystick.

*Primary Examiner*—Richard A. Hjerpe

[57] ABSTRACT

A joystick for a computer game which comprises a stick lever, a trigger button and a function button. In the joystick, when the function button is pressed down while the stick lever is inclined in one of directions or the trigger button is depressed, an operation specified by the inclination direction of the stick lever or by the trigger button can be executed intermittently or continuously, so that, even if the trigger button is operated long, it is possible to enhance the operation of the joystick, to reduce the fatigue of a player and to extend the life of the joystick.

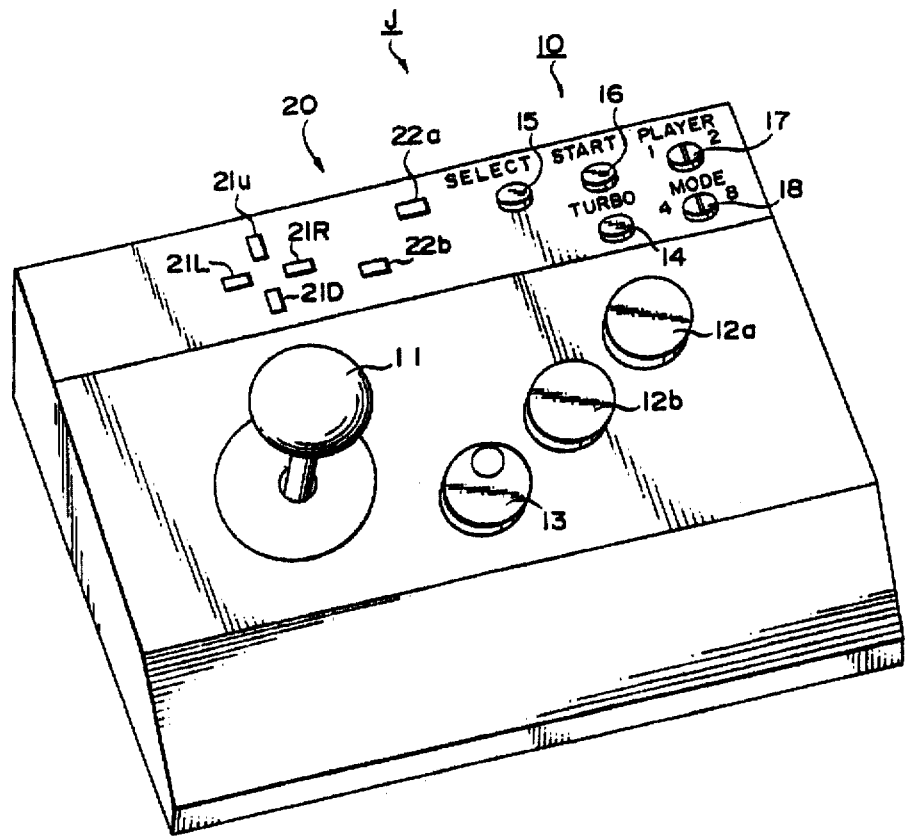

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are cancelled.

Claims 3–8 are determined to be patentable as amended.

New claims 9–11 are added and determined to be patentable.

3. A joystick as set forth in claim [1] *11*, wherein there is provided a speed adjust button adapted to adjust a speed at which said [operation] *operations* specified by [said direction of inclination of said stick lever or] said trigger [button is] *buttons are* performed intermittently or continuously.

4. A joystick as set forth in claim [1] *11*, wherein there is provided a select button adapted to select a game and, when said function button is pressed down while said select button is being depressed, a cursor on a menu screen can be moved continuously.

5. A joystick as set forth in claim [1] *11*, wherein there is provided a start button adapted to start a game and, when said function button is pressed down while said start button is being depressed, the video game displayed on an image display device can be moved in slow motion.

6. A joystick as set forth in claim [1] *11*, wherein there are provided a plurality of LEDs respectively adapted to indicate one [of said directions] *direction of inclination of said stick lever*.

7. A joystick as set forth in claim [1] *11*, wherein there is provided an LED adapted to indicate that said operation *performed by the first or second trigger button* is being executed intermittently or continuously due to the fact that said *first or second* trigger button is depressed.

8. A joystick as set forth in claim [1] *9*, further comprising means whereby said stick lever can selectively specify 8 or 4 directions of movement for a character by said inclination of said stick lever.

*9. A joystick for a video game comprising:*
*a stick lever for specifying directions,*
*at least one trigger button which causes an operation in said video game when depressed, and*
*a function button which is arranged and configured such that when said stick lever is inclined in one of said directions when said function button is pressed down and then released, movement in a direction specified by said direction of inclination of said stick lever is continued even though the stick lever is no longer inclined in said one of said directions.*

*10. A joystick as set forth in claim 9 wherein there is provided a speed adjust button to adjust a speed at which said operation specified by said direction of inclination is performed intermittently or continuously.*

*11. A joystick for a video game comprising:*
*a stick lever for specifying directions;*
*at least two independent trigger buttons including a first independent trigger button which causes a first corresponding operation in said video game when depressed and a second trigger button which causes a second corresponding operation in said video game when depressed, said first and second corresponding operations being independent of each other; and a function button arranged and configured to provide all of the following functions*
*when said first trigger button is depressed when said function button is pressed down and then released, the operation performed by the first trigger button being depressed is continued to be performed even though the first trigger button has been released,*
*when the second trigger button is depressed when said function button is pressed down and then released, the operation performed by the second trigger button being depressed is continued to be performed even though the second trigger button has been released, and*
*when both the first and second trigger buttons are depressed simultaneously when said function button is pressed down and then released, the operation performed by the first trigger button and the second operation performed by the second trigger button are continuously and simultaneously performed even though the first trigger button and the second trigger button have been released.*

\* \* \* \* \*